(12) United States Patent
Friend

(10) Patent No.: US 9,464,405 B2
(45) Date of Patent: Oct. 11, 2016

(54) FINE IMPLEMENT CONTROL SYSTEM UTILIZING RELATIVE POSITIONING

(71) Applicant: Caterpillar Inc., Peoria, IL (US)

(72) Inventor: Paul Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/611,825

(22) Filed: Feb. 2, 2015

(65) Prior Publication Data
US 2016/0222630 A1 Aug. 4, 2016

(51) Int. Cl.
*E02F 9/20* (2006.01)
*G05D 1/02* (2006.01)
*G05D 1/00* (2006.01)

(52) U.S. Cl.
CPC ............ *E02F 9/2025* (2013.01); *E02F 9/205* (2013.01); *G05D 1/0016* (2013.01); *G05D 1/0214* (2013.01); *G05D 1/0276* (2013.01)

(58) Field of Classification Search
CPC .... E02F 9/2025; E02F 9/205; G05D 1/0214; G05D 1/0016; G05D 1/0276
See application file for complete search history.

(56) References Cited

U.S. PATENT DOCUMENTS

| | | | |
|---|---|---|---|
| 6,194,860 B1 * | 2/2001 | Seelinger | B25J 5/007 318/586 |
| 7,797,934 B2 | 9/2010 | Bacon et al. | |
| 8,517,629 B2 | 8/2013 | Gregerson | |
| 8,644,964 B2 * | 2/2014 | Hendron | E02F 9/265 700/20 |
| 2013/0264139 A1 * | 10/2013 | Braun | E02F 9/16 180/322 |
| 2013/0297046 A1 * | 11/2013 | Hendron | G05B 11/01 700/56 |
| 2014/0168620 A1 * | 6/2014 | Schmitt-Weaver | G03F 7/70516 355/52 |
| 2015/0070319 A1 * | 3/2015 | Pryor | G06F 3/0425 345/175 |

* cited by examiner

*Primary Examiner* — Rodney Butler
*Assistant Examiner* — Frederick Brushaber
(74) *Attorney, Agent, or Firm* — Miller, Matthias & Hull LLP

(57) ABSTRACT

A control system for an implement of a machine is disclosed. The control system may include a relative positioning system for providing relative positioning signals, where the relative positioning signals are representative of a position of the implement relative to a worksite. The control system may further include a controller for determining an implement control plan, where the implement control plan is based on, at least, the relative positioning signals and includes coarse control signals and fine control signals. The control system may further include a coarse control system and a fine control system that controls fine movements of the implement based on the fine control signals. The fine movements may have a fine range of motion, the fine range of motion being less than the coarse range of motion.

20 Claims, 5 Drawing Sheets

FINE IMPLEMENT CONTROL SYSTEM UTILIZING RELATIVE POSITIONING

TECHNICAL FIELD

The present disclosure generally relates to control systems for machines and, more particularly, to fine implement control systems for machines that utilize relative positioning.

BACKGROUND

Work machines, such as excavators and tele-handlers, may be used to control implements in order to perform various functions. Such implements may be utilized for a variety of tasks including, but not limited to, additive construction, loading, compacting, lifting, brushing and may include, for example, additive construction implements, buckets compactors, forked lifting devices, brushes, grapples, cutters, shears, blades, breakers, hammers, augers, and the like.

For controlling implements and their associated machines, various control systems are utilized to manually, autonomously, or semi-autonomously control movement of the work implement in the X, Y, and Z directions. For example, control systems for implements can control orientation of the implement, such as, but not limited to, a roll, a pitch, and/or a yaw of the implement. Such control systems may utilize a controller to receive instructions from various sources (e.g., user controls, a memory, a remote control, etc.) and determine controls to execute via the control system. The control systems send signals to elements associated with the controller, such as motors or actuators, to position the implement in accordance with the determined controls.

In some control systems, a structure of the machine (e.g., a crane of an excavator) may be utilized by and actuated by the control system to control the position of the implement. These systems may use one or more actuators to control gross movement of the machine while positioning implement. However, control via such machine-associated components may not provide the desired control accuracy for all types of implements.

Some modern implement control systems, such as the control systems disclosed by U.S. Pat. No. 8,644,964 ("Method and System for Controlling Movement of an End Effector on a Machine"), may employ control schemes that transmit separate signals for coarse movement of a machine to the larger, coarse moving elements of the control system (e.g., control of a crane of an excavator) and separate signals for fine movement of the machine to other elements of the control system that are more directly associated with the implement.

However, using certain implements, merely dividing controls into coarse and fine movements may not provide accurate enough control. Therefore, control systems and methods for controlling an implement that utilize relative positioning are desired.

SUMMARY

In accordance with one aspect of the disclosure, a control system for an implement of a machine is disclosed. The control system may include a relative positioning system for providing relative positioning signals, where the relative positioning signals are representative of a position of the implement relative to a worksite. The control system may further include a controller for determining an implement control plan, where the implement control plan is based on, at least, the relative positioning signals and include coarse control signals and fine control signals. The control system may further include a coarse control system that receives the coarse control signals from the controller and controls coarse movements of the implement based on the coarse control signals. Coarse movements may be movements having a coarse range of motion. The coarse control system may further include one or more coarse actuators for positioning the implement using coarse movements based on the coarse control signals. The control system may further include a fine control system that receives the fine control signals from the controller and controls fine movements of the implement based on the fine control signals. The fine movements may have a fine range of motion, the fine range of motion being less than the coarse range of motion. The fine control system may further include one or more fine actuators for positioning the implement using fine movements based on the fine control signals.

In accordance with another aspect of the disclosure, a method for controlling an implement of a machine is disclosed. The method may include receiving, by a controller, relative positioning signals representative of a position of the implement relative to a worksite from a relative positioning system. The method may further include determining, by the controller, an implement control plan, the implement control plan based on, at least, the relative positioning signals and including coarse control signals and fine control signals. The method may further include receiving, by a coarse control system, the coarse control signals, the coarse control system including one or more coarse actuators and receiving, by a fine control system, the fine control signals, the fine control signals including one or more fine actuators. The method may further include controlling coarse movements of the implement based on the coarse control signals by positioning the implement using the one or more coarse actuators, the coarse movements having a coarse range of motion. The method may further include controlling fine movements of the implement based on the fine control signals by positioning the implement using the one or more fine actuators, the fine movements having a fine range of motion, the fine range of motion being less than the coarse range of motion.

In accordance with yet another aspect of the disclosure, a fine control system for an implement of a machine is disclosed. The fine control system is used for controlling fine movements of the implement based on an implement control plan. The fine control system may include a relative positioning system for providing relative positioning signals, the relative positioning signals representative of a position of the implement relative to a worksite. The fine control system may further include a controller for determining the implement control plan, the implement control plan based on, at least, the relative positioning signals and including control signals. The fine control system may further include one or more fine actuators for positioning the implement using fine movements based on the fine control signals. The fine control system may further include a fine control structure, the fine control structure including one or more fine control components operatively associated with the implement, the one or more fine control components moved by the one or more fine control actuators to position the implement based on the fine control signals.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
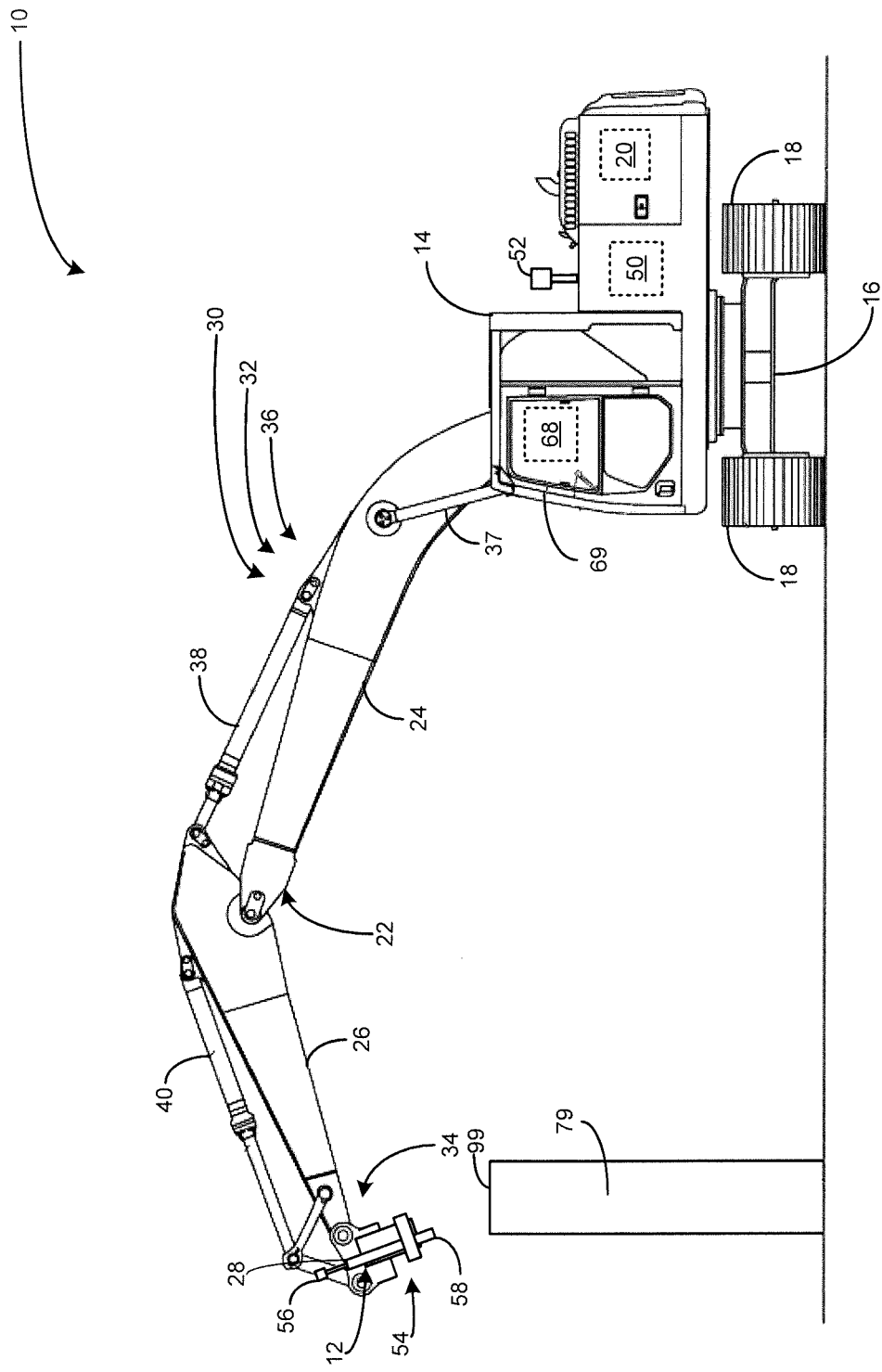
FIG. 1 is a side view of an example machine including a control system according to an embodiment of the present disclosure.

Turning now to the drawings and with specific reference to FIG. 1, a machine 10 having an implement 12 is illustrated in accordance with the teachings of the present disclosure. While the machine 10 in FIG. 1 is depicted, generally, as an excavator, the teachings of the present disclosure may relate to other work machines that employ control systems for an implement associated with said machine. The term "machine" as used herein may refer to any machine that performs some type of operation associated with an industry such as mining, construction, farming, transportation, or any other industry known in the art. For example, the machine 10 may be an earth-moving machine, such as a wheel loader, excavator, dump truck, backhoe, motor grader, material handler, or the like. Moreover, the work implement 12 connected to the machine may be utilized for a variety of tasks including, but not limited to, additive construction, loading, compacting, lifting, brushing and may include, for example, additive construction implements, buckets compactors, forked lifting devices, brushes, grapples, cutters, shears, blades, breakers, hammers, augers, and the like.

As depicted in FIG. 1, the machine 10 may include a housing 14 disposed on top of and supported by an undercarriage 16. The undercarriage 16 may be associated with one or more ground engaging devices 18, which may be used for mobility and propulsion of the machine 10. The ground engaging devices 18 are shown as a pair of continuous tracks; however, the ground engaging devices 18 are not limited to being continuous tracks and may additionally or alternatively include other ground engaging devices such as rotatable wheels. A power system 20 is may provide power to the propel or otherwise move the ground engaging devices 18 and may include one or more power sources, such as internal combustion engines, electric motors, fuel cells, batteries, ultra-capacitors, electric generators, and/or any power source which would be known by a person having ordinary skill in the art. Such a power system 20 may further be used to power various motion of the implement 12 or any other elements and control systems associated with the machine 10 and/or implement 12.

For control of the implement 12, the machine may further include a crane 22, which may include a boom 24 operatively coupled with a stick 26. The implement 12 may be attached to the crane at, for example, a distal end 28 of the stick 26. For positioning the implement 12, the crane 22 and, as associated elements, the boom 24 and stick 26, may be controlled by an implement control system 30, which includes a coarse control system 32 and a fine control system 34. The control system 30 is shown in a schematic depiction in FIG. 2.

Figure 2:
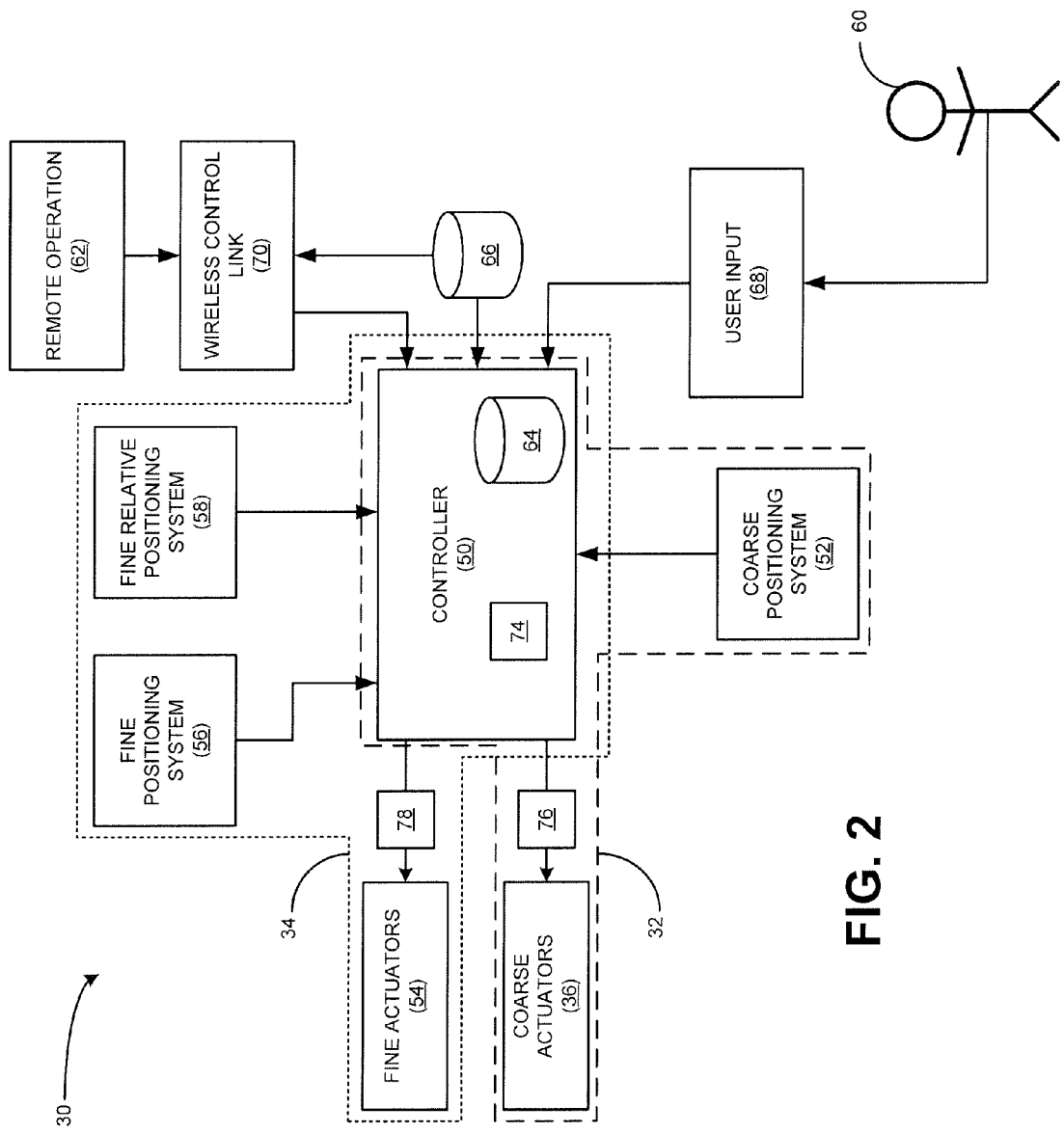
FIG. 2 is a schematic representation of the control system of FIG. 1, in accordance with the present disclosure and the embodiment of FIG. 1.

With reference to both FIGS. 1 and 2, the coarse control system 32 may include a plurality of coarse control actuators 36 for positioning and/or otherwise moving the implement 12. The plurality of coarse control actuators 36 may include, but are not limited to including, hydraulic actuators, motors, or any other suitable device for receiving instructions to actuate a component of the machine 10, the implement 12, or any other component associated with the machine 10 which may affect motion of the implement 12. The plurality of coarse control actuators 36 may include one or more boom actuator(s) 38 for rotating, raising, lowering, and/or otherwise positioning the boom 24 relative to the housing 14 when said boom actuator(s) 37 are actuated. For controlling positioning of the stick 26 relative to the boom 24, the plurality of coarse control actuators 36 may include one or more stick actuator(s) 38, which may rotate, raise, lower, and/or otherwise position the stick upon actuation. The plurality of coarse control actuators 36 may further include implement actuator(s) 40 for controlling coarse positioning of the implement. Implement actuator(s) 40 may rotate, raise, lower, and/or otherwise position the implement upon actuation.

To provide signals to the plurality of coarse control actuators 36 for actuation, the coarse control system may include or be otherwise operatively associated with a controller 50. The controller 50 is operatively associated with the coarse control system 32 and its associated elements, which include, but are not limited to including, the coarse control actuators 36 and a coarse positioning system 52. The controller 50 may further be used to control the fine control system 34. As such, the controller 40 may be operatively associated with elements of the fine control system 34, including, but not limited to, fine actuators 54, a fine positioning system 56, and a relative positioning system 58.

The controller 50 may be used to control the implement 12 in a variety of autonomous, semi-autonomous, or manual modes. As used herein, an implement 12 of a machine 10 operating in an autonomous manner operates automatically based upon information received from various sensors without the need for human operator input. Further, an implement 12 of a machine 10 operating semi-autonomously may include an operator 60, either within the machine 10 or remotely, who performs some tasks or provides some input while other tasks are performed automatically based upon information received from various sensors. An implement 12 of a machine 10 being operated manually is one in which an operator 60 is controlling all or essentially all of the direction, speed and manipulating functions of the implement 12 of the machine 10. An implement 12 of a machine 10 may be operated remotely by an operator (e.g., a remote operation 62) in either a manual or semi-autonomous manner.

Operation of the implement 12, in any of the above referenced manners, may be executed by the controller 50. The controller 50 may be any electronic controller or computing system including a processor which operates to perform operations, execute control algorithms, store data, retrieve data, gather data, and/or any other computing or controlling task desired. The controller 50 may be a single controller or may include more than one controller disposed to control various functions and/or features of the implement 12 and the machine 10. Functionality of the controller 50 may be implemented in hardware and/or software and may rely on one or more data maps relating to the operation of the machine 10 and the implement 12. To that end, the controller 40 may include internal memory 64 and/or the controller 50 may be otherwise connected to external memory 66, such as a database or server. The internal memory 64 and/or external memory 66 may include, but are not limited to including, one or more of read only memory (ROM), random access memory (RAM), a portable memory, and the like. Such memory media are examples of nontransitory memory media.

User input 68 may be included with the control system 30 so that the operator 60 may have the ability to operate/control the implement 12 of the machine 10. For example, user input 68 may be provided within a cab 69 of the housing 14 of the machine 10, wherein the operator 60 may provide commands for the implement 12 when the machine 10 is operating in either a manual or semi-autonomous manner. The user input 68 may include one or more input devices through which the operator 60 may issue commands to control the implement 12 of the machine 10 by employing one or both of the coarse control system 32 and the fine control system 34 of the control system 30.

Additionally or alternatively, the control system 30 may include a wireless control link 70 which is connected to a wireless network. Via the wireless control link 70, commands may be given to the implement 12 via the controller 50 from a remote operation 62 (e.g., a command center, a foreman's station, and the like). Further, information may be accessed from and/or stored to the external memory 66 using the wireless control link 70. In certain embodiments, control of the implement via the control system 30 may be distributed such that certain functions are performed at the machine 10 level (e.g., by the operator 60 utilizing the user input 68) and other functions are performed via remote operation 62.

Further, the control system 25 may be configured to implement an implement control plan 74. The implement control plan 74 may be instructions stored on at least one of the internal memory 64 and/or the external memory 66 and executed by the controller 50. The implement control plan 74 may be influenced by elements of the control system 30, such as any input or feedback from the coarse positioning system 52, the fine positioning system 56, the relative positioning system 58, the user input 68, the remote operation 62, or any other conditions or controls associated with the implement 12 or the machine 10. The implement control plan 74 may include one or more passes for a given task associated with the implement 12.

The implement control plan 74 includes both coarse control signals 76 and fine control signals 78. The coarse control signals may be transmitted from the controller 50 to the coarse control system 32 and, more specifically, may be transmitted to one or more of the coarse control actuators 36.

The coarse control actuators 36, upon receiving the coarse control signals 76, may be actuated to execute coarse movements of the implement 12 in accordance with the implement control plan 74. Similarly, the fine control signals 78 may be transmitted from the controller 50 to the fine control system 34 and, more specifically, may be transmitted to one or more of the fine actuators 54. Upon receiving the fine control signals 78, the fine actuators 54 may be actuated to perform fine movements of the implement 12 in accordance with the implement control plan 74. "Fine movements" may be any movement of the implement 12 that has a range of motion that is less than the range of motion of the coarse movements.

For example, the implement control plan 74 may execute instructions for additive construction using the machine 10 and the implement 12. Additive manufacturing, also often referred to as three-dimensional printing, is a process of creating three-dimensional structures from a digital plan or design file. Such additive manufacturing plans and/or designs can be transformed into cross-sections and used to form successive layers to be laid by an additive manufacturing device. The implement control plan 74 may include such digital plans and/or design files. In such examples, the implement 12 may be an additive construction device (e.g., an extruder) for laying down successive layers of material to construct a structure 79. In such an implement control plan 74, instructions may include tool path instructions for the implement 12 that are generated based on a digital, three-dimensional model. The instructions may include successive layers of material to be laid until construction of the structure to be manufactured is completed. In such applications, precise control of the implement 12, using the control system 30, is required to properly and accurately lay the successive layers to construct the desired structure.

Figure 3:
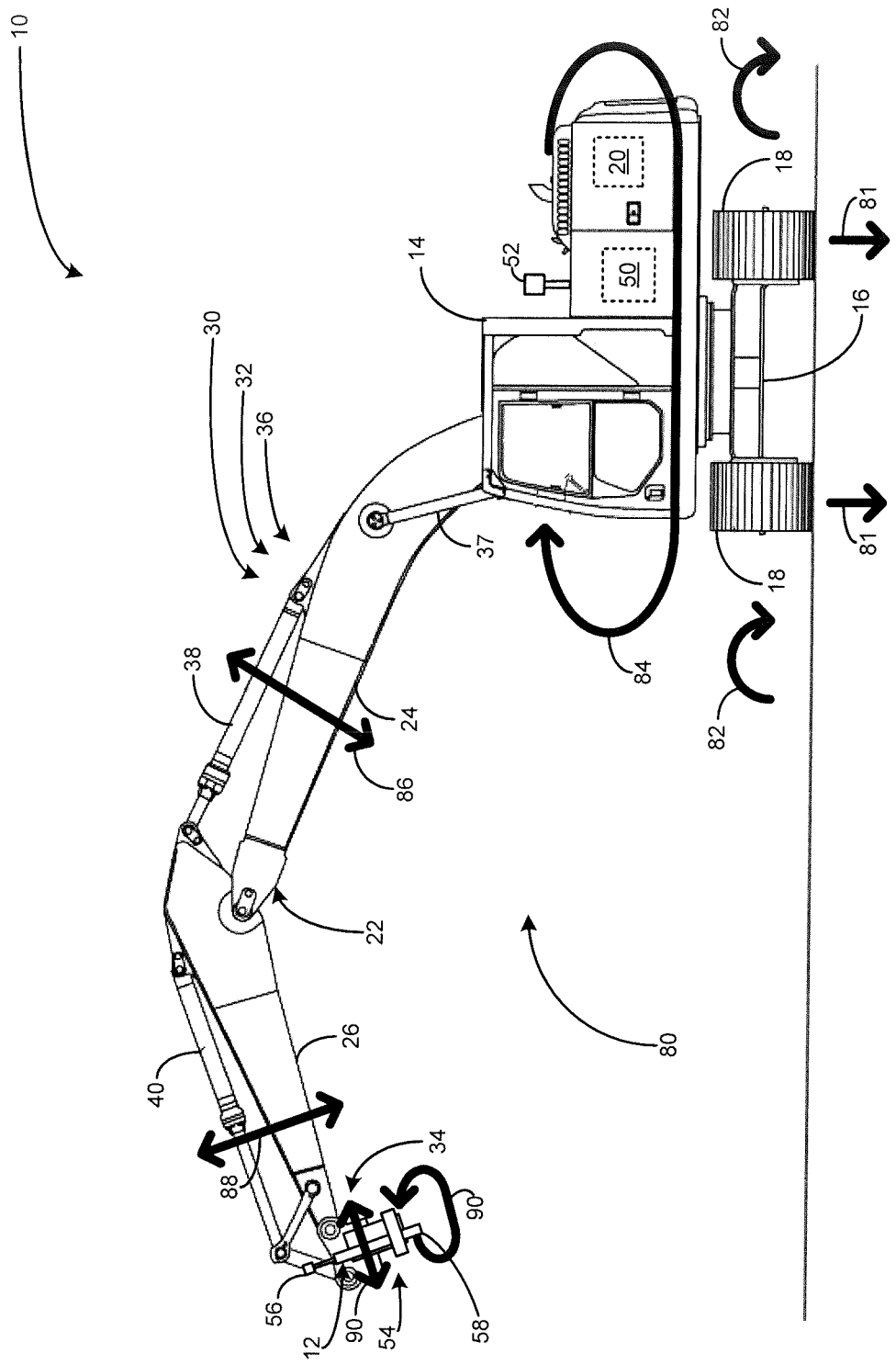
FIG. 3 is another side view of the example machine of FIG. 1, but depicted showing functional characteristics of a coarse control system associated with the control system depicted in FIGS. 1 and 2.

As mentioned above, the control system 30 includes the coarse control system 32, whose functions are further illustrated in FIG. 3 and described herein. In generating, implementing, optimizing, or otherwise affecting desired controls for the coarse control system 32, the controller 50 may receive and utilize information provided by the coarse positioning system 52. In view of such desired controls, the coarse control system 32 controls coarse movement of the implement 12. For example, the coarse control system 32 may control movement of an implement in a range of motion that includes any motion plus or minus three inches along a desired path of movement instructed by the controller 50. However, this example is merely exemplary, and coarse movement controlled by the coarse control system 32 may be any range of motion which is greater than a range of motion of the fine control system 34.

In the non-limiting example of such a coarse control system 32 and the non-limiting example motion instructions 80 shown in FIG. 3, the coarse control system 32 may control the initial placement of the machine 10 by transmitting propulsion instructions 81 to the ground engaging member(s) 18 and/or transmitting rotation instructions 82 for the ground engaging members to one or both of the ground engaging member(s) 18 and the undercarriage 16. Additional actuators (not shown) for positioning the ground engaging member(s) 18 and the undercarriage 16 may also be included. The coarse control system 32 may further provide control of the rotational position of the housing 14 via transmitting housing rotation instructions 84, which may be received by the housing 14, the undercarriage 16, and/or any other actuator or further movement device associated with the coarse control system 32. The housing rotation instructions 84 may set a gross position for the crane 22.

The crane 22 may be further controlled by boom height instructions 86 transmitted to boom actuator(s) 37. The boom height instructions 86 may raise or lower the boom 24 in accordance with the desired path of motion for the implement 12. The implement 12 may be further raised or lowered upon actuation of arm actuator(s) 38 based on arm height instructions 88, which may be transmitted to the arm actuator(s) 38 by the controller 40. Further, the implement 12 may be further raised, lowered, or otherwise positioned via coarse implement instructions 90, which may be transmitted to and executed by the implement actuator(s) 40.

The implement 12 may be further positioned, moved, rotated, or otherwise controlled by the fine control system 34. The fine control system 34 may be used to execute fine movements necessary for positioning the implement 12. The "fine movements" executed by the fine control system 34 may be any movement within any range of motion that is less than the range of motion of the coarse control system 32. For example, the fine control system 34 may control movement of an implement 12 in a range of motion that includes any motion plus or minus two millimeters along a desired path of movement instructed by the controller 50. The fine control system 34 is shown in a three-dimensional perspective view in FIG. 4. References to axes and planes, on which the depiction of the fine control system 34 is disposed, are made in view of the depicted "X," "Y," and "Z" axes.

To control fine movement of the implement 12, the fine control system may include a fine control structure 92, which may be positioned in response to actuation one or more of the fine actuators 54. The fine control structure 92 is operatively associated with the implement 12, but in some examples the fine control structure 92 may be considered a component of the implement 12 itself, while still controlled by the fine control system 34. Alternatively, the fine control structure 92 may be a structure independent of the implement 12, wherein the implement is operatively associated with the fine control structure 92. The fine control structure 92 may further be attached, mounted to, or otherwise operatively associated with the stick 26 of the crane 22 at, for example, the distal end 28 of the stick 26. The fine actuators 54 may be located and operatively connected to at any location on the fine control structure 92 where the fine actuators 54 may be useful for positioning the implement 12. For example, and as shown, the fine actuators 54 may be located at connective points of positioning components of the fine control structure. Further, the fine actuators 54 may include, but are not limited to including, hydraulic actuators, motors, or any other suitable device for receiving instructions to position the implement 12 via, for example, the fine control structure 92.

The fine control structure 92 may be comprised of one or more associated components which pivot and/or otherwise move about any of the x, y, and/or z-axes to position the implement 12. Movement of elements of the fine control structure 92 may result from actuation of one or more of the fine actuators 54 in response to the fine control signals 78. In the non-limiting example of FIG. 4, the fine control structure includes a first leg 94 that may connect to the distal end 28 of the stick 26 and shown extending along the z-axis, a second leg 96 that may pivotally connect to the first leg and shown extending along the x-axis, a first mount 97 that may be connected to the second leg and on which the implement 12 may be mounted, and a second mount 98 that may be connected to one or both of the implement 12 and the first mount 97 and may be able to rotate the implement 12. When actuated using one or more of the fine actuators 54, the first leg may rotate, raise, lower, or otherwise move the implement 12 with respect to the positioning of the stick 26, as it may be connected to the distal end 28 of the stick 26. The second leg 96 may be pivotally connected to the first leg 94 and may rotate, raise, lower, or otherwise move the implement 12 with respect to the positioning of the first leg 94, when actuated by the fine actuators 54. The first mount 97 may be attached or otherwise operatively associated with the second leg 96 and may allow provide connection between the second leg 96 and the implement 12, such that it allows the implement 12 to move with the motion of the second leg 96, when moved by actuation of the fine actuators 54. In some examples, the first mount 97 may be movable with respect to the plane on which the second leg 96 is disposed. For example, the first mount 97 may be mounted to the second leg 96 via a track mount that allows the first mount 97 to move along the length of the second leg 96. Additionally, the second mount 98 may be used to further rotate the implement 12 along any plane on which the implement 12 is already positioned by upstream elements of the fine control system 34.

Feedback for determining both coarse controls and fine controls for a control scheme (e.g., the implement control plan 74) may be provided by the coarse positioning system 52, the fine positioning system 56, and/or the relative positioning system 58. The positioning systems 52, 56 may be employed to determine absolute positioning of the implement 12 and/or the machine 10 relative to a worksite. The positioning systems 52, 56 may include one or more GPS sensors for detecting locations of the machine 10 or one or more elements of the machine 10 relative to the worksite. Other elements of the positioning systems 52, 56 may include, but are not limited to including, perception based system sensors, and laser position detection systems, total station receivers, ranging radios, single or dual Global Navigation Satellite System (GNSS) receivers, and the like. All elements of the positioning systems 52, 56 may be used to determine the real time actual positioning of the implement 12 and/or the machine 10. Of course, other elements aiding in detecting positioning of implement 12 and/or the machine 10 or the worksite may be included and input from other sensors or receivers may also be used in determining the positioning of the implement 12 and/or the machine 10.

For relative position sensing, the relative positioning system 58 provides further feedback to the controller, which may be used for forming control instructions (e.g., the implement control plan 74) and/or altering existing control instructions. The relative positioning system 58 may include one or more perception sensors for determining positioning relative to a past operation of the machine. For example, the relative positioning system may include one or more cameras, LiDAR system, or any other perception sensing device. LiDAR is a radar-like remote sensing technology that measures distance by illuminating a target with a laser and analyzing the reflected light (the term LiDAR is a portmanteau of "light" and "radar"). The relative positioning system 58 may generate images to be processed by the controller 40 and used to determine future positioning for the implement 12. In the example shown in FIG. 4, the relative positioning system may be used to detect an edge 99 of the structure 79.

The ability of the relative positioning system 58 to determine relative position of the implement for use in future position may be useful when the implement control plan 74 requires multiple passes to perform a task. Returning to the aforementioned, non-limiting example, where the implement 12 is an additive construction device, the implement control plan 74 may determine where the implement 12 should be positioned when executing the next pass for adding a next layer to the structure 79. Feedback from the relative positioning system 58 may be utilized by the controller 50 to provide instructions to align the implement on top of the last pass, because the signals provided by the relative positioning system 58 from the previous pass can detect the edge 99 of the materials of the structure 79 laid in the previous pass.

INDUSTRIAL APPLICABILITY

The present disclosure generally relates to control systems for machines and, more specifically, to fine implement control systems for machines that utilize relative positioning. As shown above, the control system 30 may be employed for control of an excavator; however, the systems and methods of the present disclosure may be applied to any work machines performing a task such as, but not limited to, additive construction, loading, compacting, lifting, brushing, and the like. Further, such machines may include one or more implements to be controlled by the present disclosure's systems and methods, such implements may include, but are not limited to including, additive construction implements, buckets compactors, forked lifting devices, brushes, grapples, cutters, shears, blades, breakers, hammers, augers, and the like. By utilizing relative positioning in such control systems, the disclosed systems and methods may provide greater control accuracy for an implement of a machine, such as the implement 12 of the machine 10.

Figure 4:
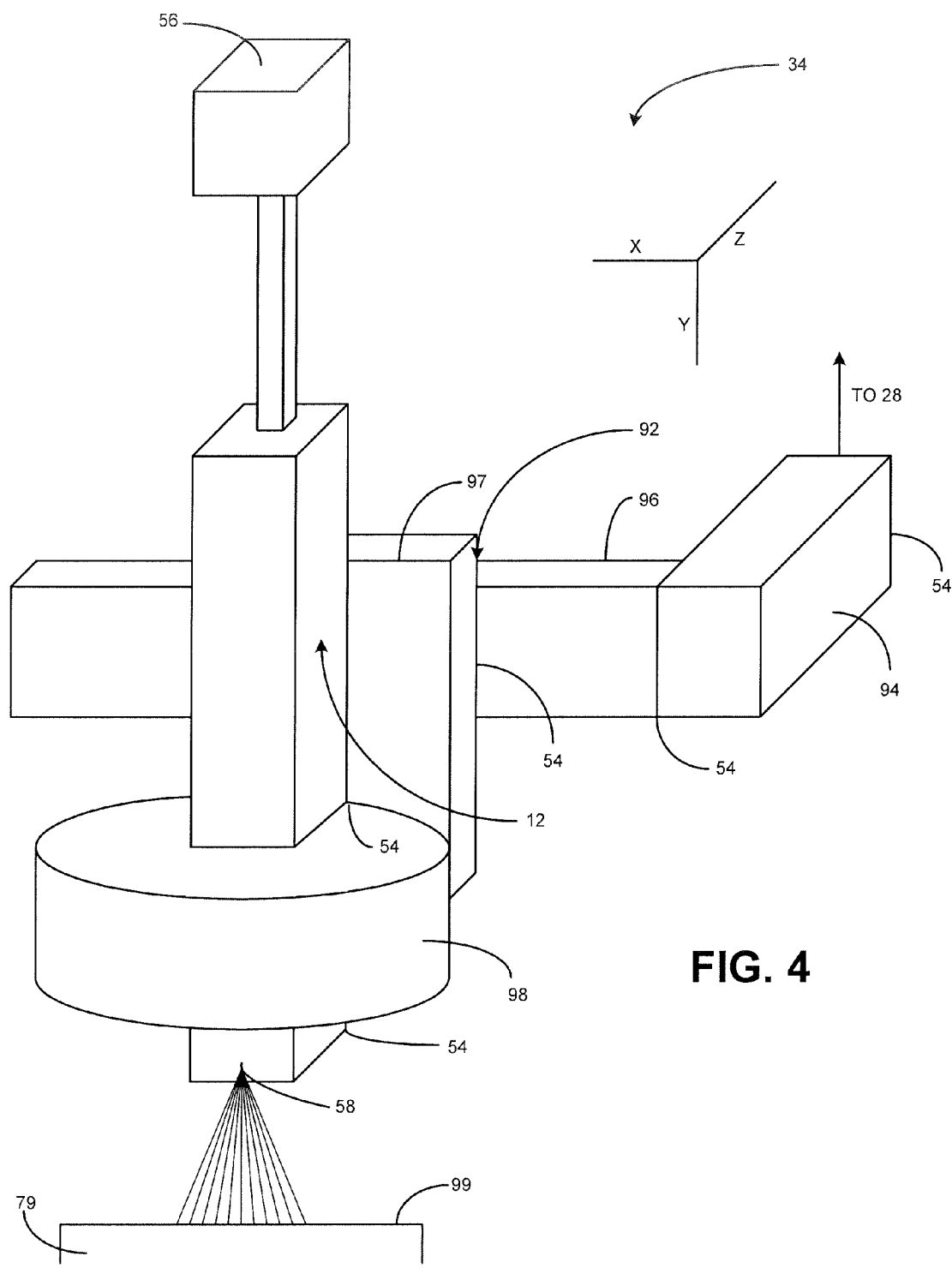
FIG. 4 is a three-dimensional perspective view of a fine control system associated with the control system of FIG. 1 and depicted in a magnified fashion.
Figure 5:
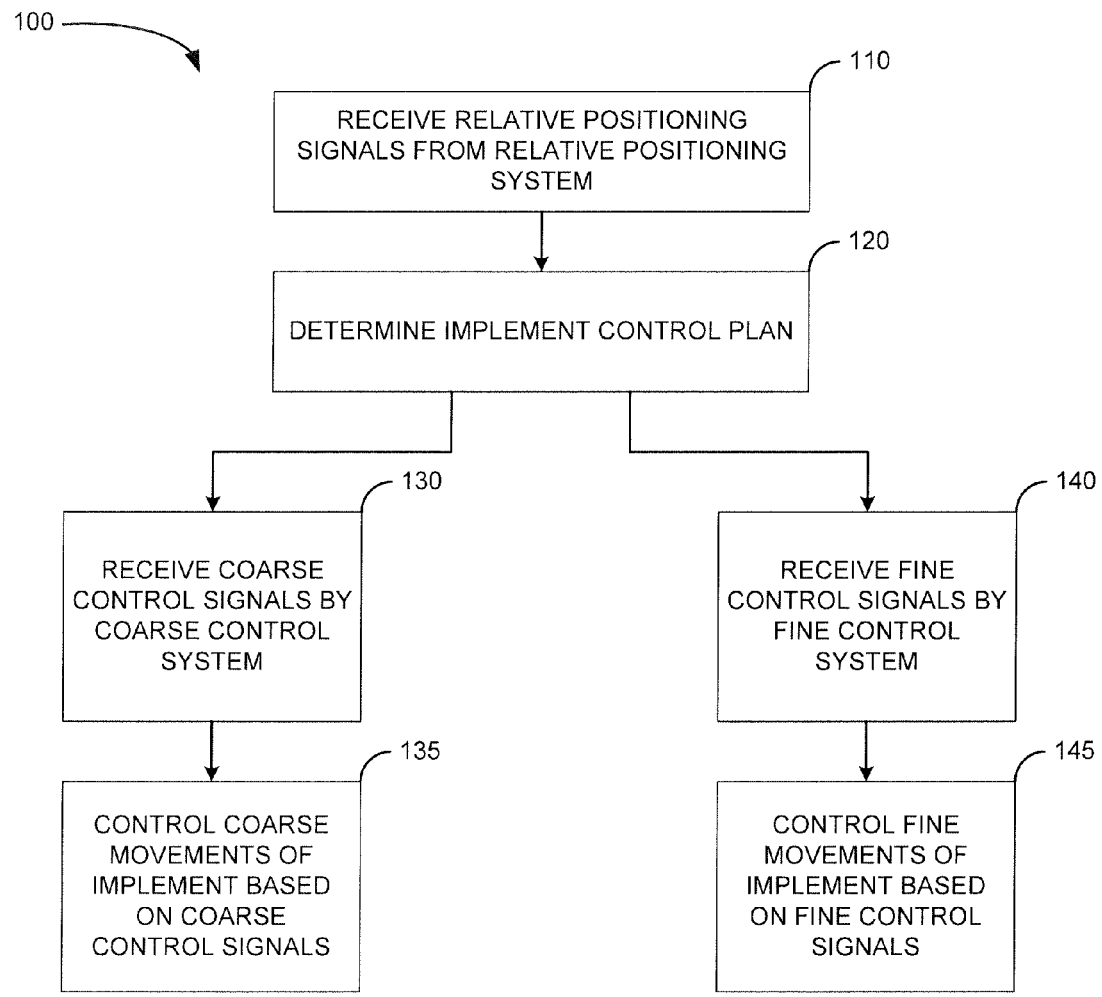
FIG. 5 is a flow chart representative of a method for controlling an implement of a machine, in accordance with the present disclosure.

To that end, FIG. 4 illustrates a flowchart for an example method 100 for controlling the implement 12 of the machine 10, which includes utilization of the relative positioning system 58 for fine control and improved accuracy. The method begins at block 110, when the controller 50 receives relative positioning signals from the relative positioning system 58. The relative positioning signals may be representative of a position of the implement 12 relative to a worksite (e.g., the structure 79). Determining the relative positioning signals by the relative positioning system 58 may be based on information indicative of the edge 99 of the structure 79 relative to a first position of the implement 12 during a first pass of the implement 12. The relative positioning signals provided by the relative positioning system 58 may provide greater accuracy in path planning for the implement control plan 74, as compared to prior implement control systems.

At block 120, the controller 50 determines the implement control plan 74, which is based on, at least, the relative positioning signals generated by the relative positioning system 58. In some examples, determining the implement control plan may further include determining second pass instructions for positioning the implement 12 during a second pass of the implement, the second pass instructions being based on information indicative of the edge 99 of the structure 79 relative to the first position of the implement 12 during the first pass of the implement 12. The implement control plan 74 can further be based on one or more of signals from the coarse positioning system 52 and/or the fine positioning system 56, signals from the user input 68, signals from the remote operation 62, signals from the internal memory 64 and/or the external memory 66 of the controller 50, and/or any other feedback or input useful in formulating the implement control plan 74. The implement control plan 74 may include coarse control signals 76 and fine control signals 78.

The coarse control signals 76 are received by the coarse control system 32, as shown in block 130, and are used to control or otherwise position the implement in accordance with the coarse control signals 76, as shown in block 135. One or more of the coarse control actuators 36 may be used to position the implement 12. Similarly, the fine control signals 78 are received by the fine control system 34, as shown in block 140, and are used to control or otherwise position the implement 12 in accordance with the fine control signals 78, as shown in block 145.

As described above, the control system 30 and the method 100 may be useful when the implement 12 is an additive manufacturing implement. Using signals output by the relative positioning system 58 and using said signals to formulate the implement control plan 74, the implement 12 may have greater accuracy in laying successive layers because the implement control plan 74 will be based upon the relative position of the implement 12 to the edge 99 of the last pass of the implement 12, when additively manufacturing the structure 79. While the disclosed systems and methods are useful in additive manufacturing applications, the disclosed systems and methods are certainly not limited to use in additive manufacturing applications.

It will be appreciated that the present disclosure provides fine control systems for implements of machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. A control system for an implement, the implement associated with a machine, the control system comprising:
   a relative positioning system including one or more perception sensors operatively affixed to the implement and configured for determining positioning of the implement relative to a past operation of the machine, the relative positioning system utilizing input from the perception sensors to determine relative positioning signals, the relative positioning signals representative of a position of the implement relative to a worksite;
   a controller for determining an implement control plan, the implement control plan based on, at least, the relative positioning signals and including coarse control signals and fine control signals;
   a coarse control system receiving the coarse control signals from the controller and controlling coarse movements of the implement based on the coarse control signals, the coarse movements having a coarse range of motion, the coarse control system including one or more coarse actuators for positioning the implement using coarse movements based on the coarse control signals; and
   a fine control system receiving the fine control signals from the controller and controlling fine movements of the implement based on the fine control signals, the fine movements having a fine range of motion, the fine range of motion being less than the coarse range of motion, and the fine control system including one or more fine actuators for positioning the implement using fine movements based on the fine control signals.

2. The control system of claim 1, wherein the relative positioning signals include information indicative of an edge of the worksite relative to a first position of the implement during a first pass of the implement.

3. The control system of claim 2, wherein the implement control plan includes second pass instructions for positioning the implement during a second pass of the implement, the second pass instructions based on the information indicative of the edge of the worksite relative to the first position of the implement during the first pass of the implement.

4. The control system of claim 1, further comprising at least one positioning system associated with at least one of the implement and the machine and providing positioning signals to the controller, wherein the implement control plan is further based on the positioning signals.

5. The control system of claim 1, further comprising a user control system for providing user input signals to the controller, wherein the implement control plan is further based on the user input signals.

6. The control system of claim 1, further comprising a remote operation, the remote operation for providing remote control signals to the controller, wherein the implement control plan is further based on the remote control signals.

7. The control system of claim 1, further comprising a memory operatively associated with the controller, the memory storing planned control signals and providing the planned control signals to the controller, wherein the implement control plan is further based on the planned control signals.

8. The control system of claim 1, wherein the implement is an additive construction implement and the implement control plan is an additive construction control plan.

9. The control system of claim 1, wherein the fine control system further includes a fine control structure, the fine control structure including one or more fine control components operatively associated with the implement, the one or more fine control components moved by the one or more fine control actuators to position the implement based on the fine control signals.

10. The control system of claim 1, wherein the machine further includes a housing and a crane and wherein the one or more coarse actuators position the implement by moving at least one of the housing and the crane based on the coarse control signals.

11. The control system of claim 10, wherein the crane includes a boom operatively connected to the housing and a stick operatively connected to the boom and the implement, and wherein the one or more coarse actuators position the implement by moving at least one of the boom relative to the housing, the stick relative to the boom, and the implement relative to the stick.

12. A method for controlling an implement of a machine, the method comprising:

determining, by a relative positioning system, relative positioning signals based on input of one or more perception sensors of the relative positioning system, the one or more perception sensors being operatively affixed to the implement and configured for determining positioning of the implement relative to a past operation of the machine, the relative positioning signals representative of a position of the implement relative to a worksite;

receiving, by a controller, the relative positioning signals from the relative positioning system;

determining, by the controller, an implement control plan, the implement control plan based on, at least, the relative positioning signals and including coarse control signals and fine control signals;

receiving, by a coarse control system, the coarse control signals, the coarse control system including one or more coarse actuators;

receiving, by a fine control system, the fine control signals, the fine control signals including one or more fine actuators;

controlling coarse movements of the implement based on the coarse control signals by positioning the implement using the one or more coarse actuators, the coarse movements having a coarse range of motion; and controlling fine movements of the implement based on the fine control signals by positioning the implement using the one or more fine actuators, the fine movements having a fine range of motion, the fine range of motion being less than the coarse range of motion.

13. The method of claim 12, further comprising determining relative positioning signals based on information indicative of an edge of the worksite relative to a first position of the implement during a first pass of the implement.

14. The method of claim 13, wherein determining the implement control plan further includes determining second pass instructions for positioning the implement during a second pass of the implement, the second pass instructions based on the information indicative of the edge of the worksite relative to the first position of the implement during the first pass of the implement.

15. The method of claim 13, further comprising receiving, by the controller, positioning signals associated with at least one of the machine and the implement, the positioning signals provided by a positioning system associated with the at least one of the machine and the implement and wherein the implement control plan is further based on the positioning signals.

16. A fine control system for an implement of a machine, the fine control system controlling fine movements of the implement based on an implement control plan, the fine control system comprising:

a relative positioning system including one or more perception sensors operatively affixed to the implement and configured for determining positioning of the implement relative to a past operation of the machine, the relative positioning system utilizing input from the perception sensors to determine relative positioning signals, the relative positioning signals representative of a position of the implement relative to a worksite;

a controller for determining the implement control plan, the implement control plan based on, at least, the relative positioning signals and including fine control signals;

one or more fine actuators for positioning the implement using fine movements based on the fine control signals; and a fine control structure, the fine control structure including one or more fine control components operatively associated with the implement, the one or more fine control components moved by the one or more fine control actuators to position the implement based on the fine control signals.

17. The fine control system of claim 16, wherein machine includes a crane and the fine control structure is operatively associated with the crane, thereby connecting the fine control system to the crane.

18. The fine control system of claim 16, further comprising a positioning system associated with the implement and providing positioning signals to the controller, wherein the implement control plan is further based on the positioning signals.

19. The fine control system of claim 16, wherein the implement is an additive construction implement and the implement control plan is an additive construction control plan.

20. The fine control system of claim 16, wherein the relative positioning signals include information indicative of an edge of the worksite relative to a first position of the implement during a first pass of the implement, and wherein the implement control plan includes second pass instructions for positioning the implement during a second pass of the implement, the second pass instructions based on the information indicative of the edge of the worksite relative to the first position of the implement during the first pass of the implement.

* * * * *